(12) United States Patent
Hwang

(10) Patent No.: US 7,638,902 B2
(45) Date of Patent: Dec. 29, 2009

(54) DUAL-POWER SUPPLYING SYSTEM WITH CIRCUIT LOOP SWITCHING CONTROL CIRCUIT

(75) Inventor: Yau-Shi Hwang, Sinjhuang (TW)

(73) Assignee: TPK Touch Solutions, Inc., Taipei (TW)

( * ) Notice: Subject to any disclaimer, the term of this patent is extended or adjusted under 35 U.S.C. 154(b) by 171 days.

(21) Appl. No.: 12/010,227

(22) Filed: Jan. 23, 2008

(65) Prior Publication Data
US 2009/0184582 A1 Jul. 23, 2009

(51) Int. Cl.
*H01H 47/00* (2006.01)
(52) U.S. Cl. .......................... 307/130; 307/87
(58) Field of Classification Search .............. 307/126, 307/130, 75, 87
See application file for complete search history.

(56) References Cited

U.S. PATENT DOCUMENTS

| | | | |
|---|---|---|---|
| 3,873,846 A * | 3/1975 | Morio et al. ................ 307/23 |
| 4,745,299 A * | 5/1988 | Eng et al. .................... 307/66 |
| 4,908,790 A * | 3/1990 | Little et al. .................. 714/14 |
| 5,191,229 A * | 3/1993 | Davis et al. .................. 307/66 |
| 5,710,507 A * | 1/1998 | Rosenbluth et al. .......... 307/66 |
| 5,886,561 A * | 3/1999 | Eitan et al. ................ 327/408 |
| 5,886,880 A * | 3/1999 | Hisanaga .................... 363/20 |
| 5,945,816 A * | 8/1999 | Marusik .................... 323/273 |
| 6,137,706 A | 10/2000 | Nesbitt et al. |
| 6,297,972 B1 | 10/2001 | Chen |
| 6,380,720 B1 | 4/2002 | Cain et al. |
| 6,420,906 B1 * | 7/2002 | Kohda ........................ 326/114 |
| 6,455,953 B1 | 9/2002 | Lam |
| 6,459,604 B1 * | 10/2002 | Youn et al. ................ 363/142 |
| 6,462,434 B1 * | 10/2002 | Winick et al. ............... 307/85 |
| 6,600,239 B2 * | 7/2003 | Winick et al. ............... 307/85 |
| 6,751,109 B2 | 6/2004 | Doss et al. |
| 6,833,635 B2 | 12/2004 | Kippley |
| 7,009,859 B2 | 3/2006 | Chen et al. |
| 7,053,691 B2 * | 5/2006 | Yates et al. ............... 327/408 |
| 7,235,898 B1 * | 6/2007 | Jones et al. ................ 307/9.1 |
| 7,271,727 B2 | 9/2007 | Steeves |
| 7,289,342 B2 | 10/2007 | D'Cunha et al. |
| 7,400,063 B2 * | 7/2008 | Iwashita .................... 307/31 |
| 7,502,233 B2 * | 3/2009 | Kim et al. .................. 363/16 |
| 2005/0052164 A1 * | 3/2005 | Sakai et al. ............... 323/222 |
| 2006/0119185 A1 * | 6/2006 | Steigerwald et al. ........ 307/75 |

* cited by examiner

Primary Examiner—Albert W Paladini
Assistant Examiner—Daniel Cavallari
(74) Attorney, Agent, or Firm—Rosenberg, Klein & Lee

(57) ABSTRACT

An automatically switchable dual-power-circuit-loop circuit system selectively supplies a first power source through a first voltage output circuit loop to an output terminal, and a second power source is selectively supplied through a second voltage output circuit loop to the output terminal. A switching control circuit functions to detect the first output voltage of the first voltage output circuit loop. When the first output voltage regularly supplies electrical power, the first power source is supplied through the first voltage output circuit loop to the output terminal, while the switching control circuit generates a switching signal to switch a switching element to an open-circuit condition thereby cutting off the second voltage output circuit loop. When the first power source fails to supply power, the switching element is set in a closed-circuit condition to allow the second power source to be supplied through the second voltage output circuit loop to the output terminal.

6 Claims, 3 Drawing Sheets

DUAL-POWER SUPPLYING SYSTEM WITH CIRCUIT LOOP SWITCHING CONTROL CIRCUIT

FIELD OF THE INVENTION

The present invention relates to an automatically switchable dual-power-circuit-loop circuit system, and in particular to a dual-power supplying system with a circuit loop switching control circuit.

BACKGROUND OF THE INVENTION

Stable supply of electrical power is getting more and more important for the high-tech era, and protection to business from damage caused by power failure is one of the key factors for the success of a high-tech company. Damage caused by power failure includes computer down, loss of hard disk data, and break of power facility. The consequence caused by power failure is in general very hard to remedy for business.

To cope with the problem, an automatically switchable dual-power-circuit-loop circuit system is available in the market, which has a system architecture that is connected with two power sources of different voltage output circuit loops, such as an alternating current (AC) power source provided by electric main and a direct current (DC) power source provided by an un-interrupt power supply, respectively serving as a primary power source and a backup power source. In case that the primary power source cannot supply sufficient power or the primary power source is cut off, the automatically switchable dual-power-circuit-loop circuit system automatically switches to the backup power source to continue stable supply of power in order to protect the associated facility from damage caused by the power collapse.

FIG. 1 of the attached drawings shows a circuit diagram of a conventional automatically switchable dual-power-circuit-loop circuit system, which comprises a first voltage output circuit loop 100 and a second voltage output circuit loop 200. The first voltage output circuit loop 100 is generally comprised of a rectifier circuit 11, a filter circuit 12, an output transformer 2, a pulse-width-modulation (PWM) control circuit 3, and a first voltage output rectification/regulation circuit 4.

A first power source ACV supplies an operation voltage through the rectifier circuit 11 and the filter circuit 12 to a primary-side winding 21 of the output transformer 2 and a secondary-side winding 22 of the output transformer 2 in turn generates a secondary-side output voltage, which is applied through a rectification circuit 41 and a regulation circuit 42 of the first voltage output rectification/regulation circuit 4 to thereby provide a first output voltage DCV1.

The first output voltage DCV1 is fed through a diode 43 and is then applied to a DC voltage output terminal 5. On the other hand, the first output voltage DCV1 is also applied to a feedback circuit 44 to generate a feedback signal Sfb applied to the PWM control circuit 3.

The PWM control circuit 3 is generally comprised of a PWM controller 31, a gate driving circuit 32, a transistor switching element 33, and a sensing resistor 34. The PWM control circuit 31 receives the feedback signal Sfb generated by the feedback circuit 44 and in turn generates at an output terminal thereof, based on the feedback signal Sfb, a reference voltage Vref, and a detected signal Ssen detected by the sensing resistor 34, a gate control signal Sg, which is applied to the gate driving circuit 32 to drive the operation of the transistor switching element 33 to further control the excitation of the primary-side winding 21 of the output transformer 2. The output transformer 2 further comprises a PWM operation voltage winding 23, which generates a PWM operation voltage Vdd to the PWM controller 31.

In the second voltage output circuit loop 200, a second power source 61 and a diode 62 connected in series to the second voltage output circuit loop 200 are included. The second power source 61 supplies a second output voltage DCV2, which is applicable to the DC voltage output terminal 5.

The previously described conventional circuit suffers the drawbacks of high power consumption and being easy to generate high temperatures in components thereof. It is apparent from the conventional circuit that in normal supply of electrical power, the first voltage output circuit loop 100 provides the first output voltage DCV1 to the output terminal 5, while the second voltage output circuit loop 200 is cut off; and in case that the first voltage output circuit loop 100 fails to supply electrical power, the second voltage output circuit loop 200 starts to supply the second output voltage DCV2 to the output terminal 5. Since large currents are supplied through the diodes 43, 62, great amounts of power are consumed and problems of high temperature may be caused.

Another known automatically switchable dual-power-circuit-loop circuit system adopts power control integrated circuit (IC) to replace the diodes that are used in the previously described conventional technology. In this way, improved control and removal of the drawbacks of high power consumption and high temperature are achieved, but using power controlling means (including power transistor), which is generally of high expense, to substitute the simply-structured diode circuit makes the costs of the known circuit very high.

SUMMARY OF THE INVENTION

Thus, in view of the drawbacks and problems existing in the known automatically switchable dual-power-circuit-loop circuit system, an objective of the present invention is to provide an automatically switchable dual-power-circuit-loop circuit system that has a simple structure of circuit.

Another objective of the present invention is to provide an automatically switchable dual-power-circuit-loop circuit system that features low power consumptions and would not causes high temperature, wherein a switching control circuit combines field-effect switching means and gate control means to exclude the use of serially connected diodes that are included in the conventional technology.

To solve the above discussed problem, the solution in accordance with the present invention is to incorporate a circuit loop switching control circuit in an automatically switchable dual-power-circuit-loop circuit system and the circuit loop switching control circuit comprises an induction coil, which is coupled to an output transformer to detect power supplying condition of a first power source of a first power supply circuit loop, and a switching element connected to a second voltage output circuit loop. The switching element has an open-circuit condition and a closed-circuit condition, which are switched by a switching driving signal generated by the induction coil of the circuit loop switching control circuit. When the first power source fails to supply electrical power, a second power source takes over to supply power. In general applications, the first power source can be an alternating current power source, while the second power source is a direct current power source.

The present invention also provides an automatically switchable dual-power-circuit-loop circuit system that is applied to a pulse-width-modulation (PWM) power converter comprising no output transformer, wherein a first voltage output circuit loop comprises a PWM control circuit and a first output voltage supply circuit connected between the PWM control circuit and an output terminal. Also included is a circuit loop switching control circuit that comprises a serially-connected choke coil and a switching element connected in series to a second voltage output circuit loop. The switching element has an open-circuit condition and a closed-circuit condition, which are switched by a switching driving signal generated by the PWM control circuit.

Compared to the known technology, the present invention uses a simple circuit loop switching control circuit to realize detection of the power supplying condition of a first power source circuit loop and to control the timing of supplying power from a second power source based on the detection. Thus, automatic switching of a dual power supply circuit can be realized without expensive power control ICs. Also, the circuit loop switching control circuit employed in the present invention does not include diodes that are used in the conventional technology, the drawbacks of large power consumption and generation of high temperature commonly observed in the conventional technology can be overcome in the present invention. Conclusively, the present invention uses simple circuit elements and control circuits to realize the switching control required in a dual power supply circuit and the overall cost for the circuit of the present invention is low.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
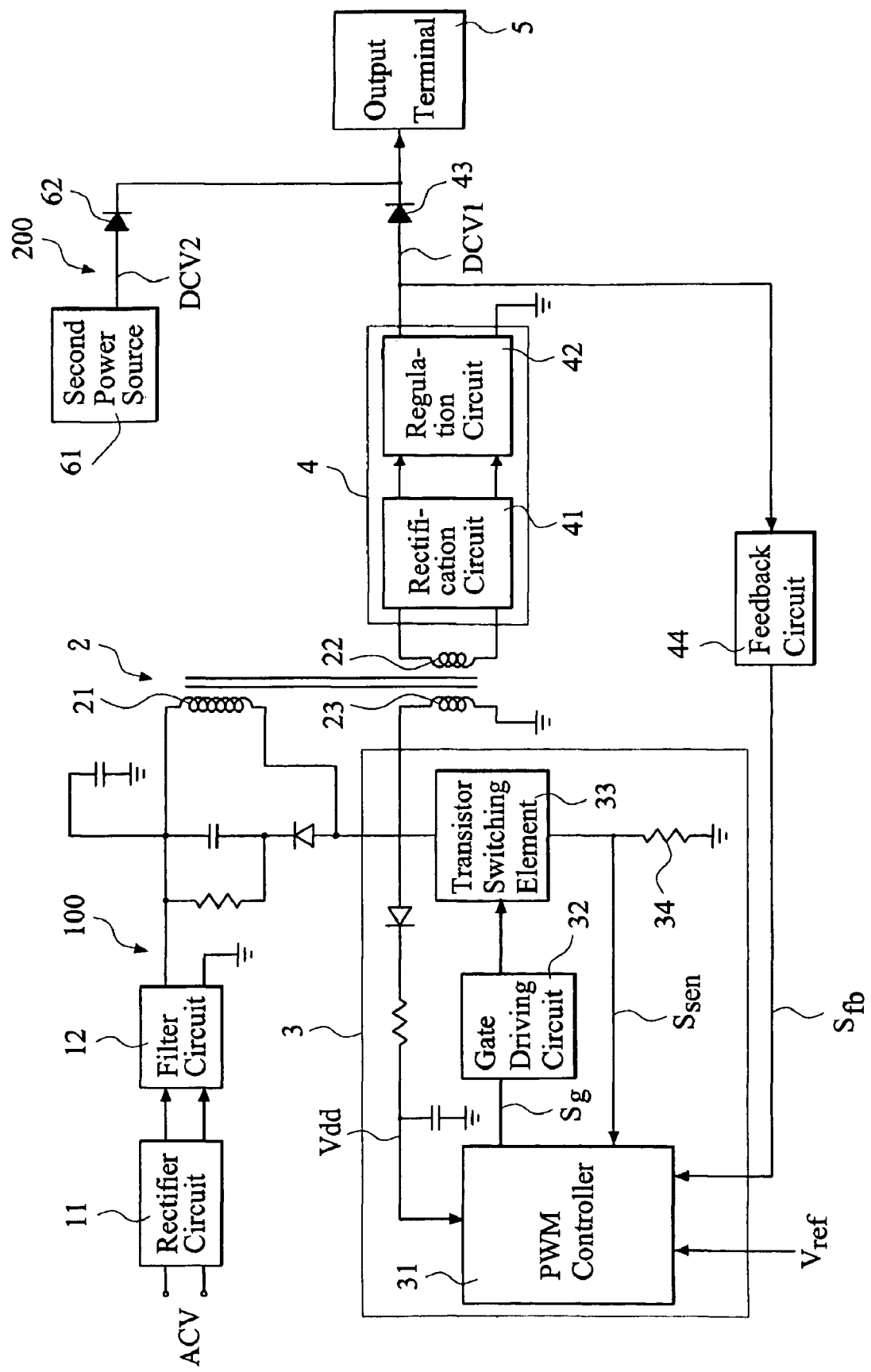
FIG. 1 is a circuit diagram of a conventional automatically switchable dual-power-circuit-loop circuit system.
Figure 2:
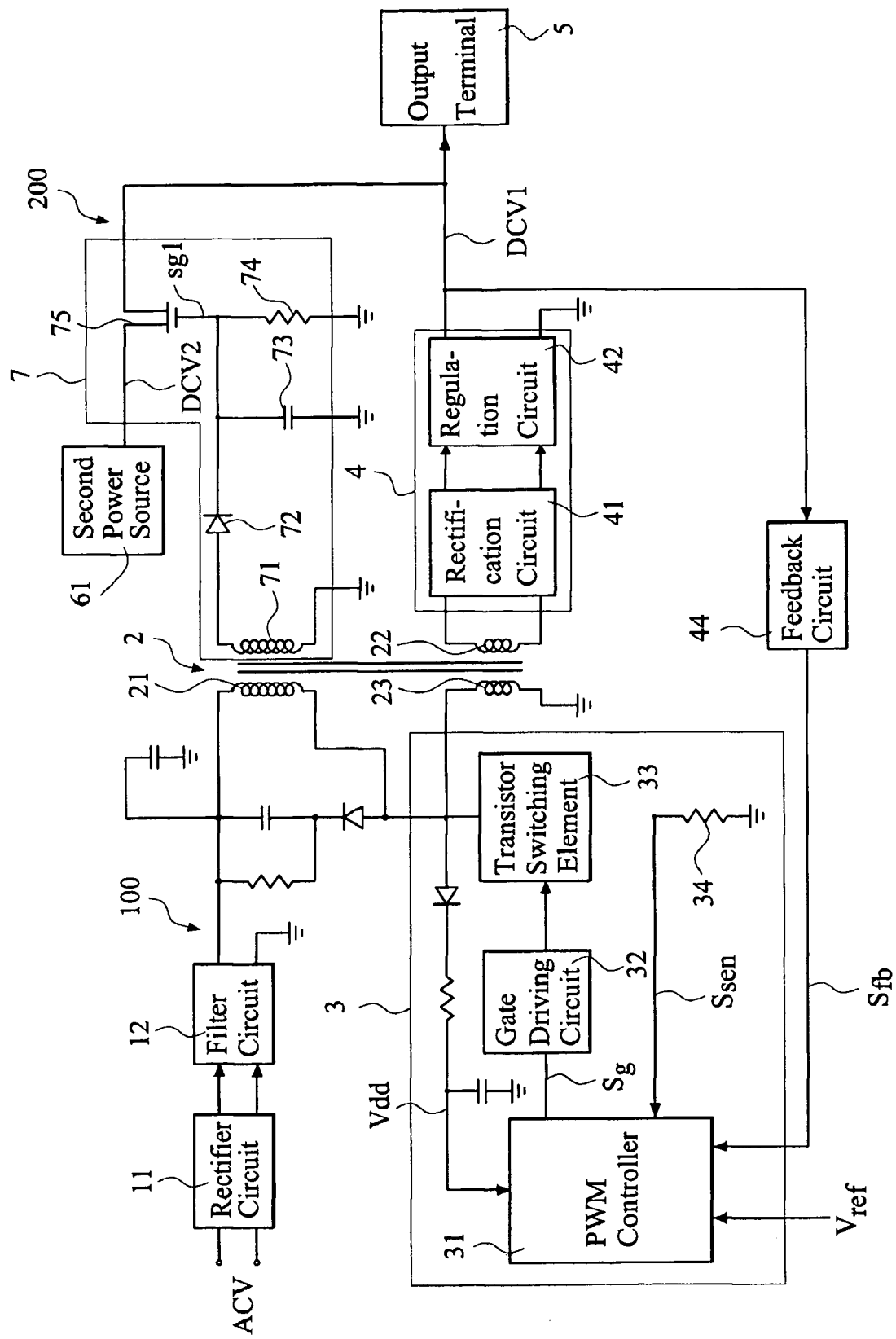
FIG. 2 is a circuit diagram of an automatically switchable dual-power-circuit-loop circuit system constructed in accordance with a first embodiment of the present invention.

With reference to the drawings and in particular to FIG. 2, which shows a circuit diagram of an automatically switchable dual-power-circuit-loop circuit system constructed in accordance with a first embodiment of the present invention, the automatically switchable dual-power-circuit-loop circuit system of the present invention comprises a first voltage output circuit loop 100 and a second voltage output circuit loop 200. Most of the components that constitute the circuit of the first embodiment of the present invention are similar or identical to those of the conventional circuit illustrated in FIG. 1, and the similar or identical components bear the same reference numerals through the drawings.

The first embodiment of the present invention, as illustrated in FIG. 2, is applicable to a control system of a pulse-width-modulation (PWM) power converter that comprises an output transformer. When a first power source ACV is in normal operation to regularly supply electrical power, the first voltage output circuit loop 100 receives an operation voltage from the first power source ACV and supplies, in turn, a first output voltage DCV1 to a direct-current (DC) voltage output terminal 5. At this time, the second voltage output circuit loop 200 is cut off. On the other hand, when the first voltage output circuit loop 100 fails to supply the electrical power, the second voltage output circuit loop 200 takes over to supply a second output voltage DCV2 from a direct current (DC) power source (second power source) to the output terminal 5.

The first voltage output circuit loop 100 is generally comprised of a rectifier circuit 11, a filter circuit 12, an output transformer 2, a PWM control circuit 3, and a rectification circuit 41, and a regulation circuit 42.

The first power source ACV supplies the operation voltage through the rectifier circuit 11 and the filter circuit 12 to a primary-side winding 21 of the output transformer 2 and a secondary-side winding 22 of the output transformer 2 in turn generates a secondary-side output voltage, which is applied through the rectification circuit 41 and the regulation circuit 42 that constitute a first voltage output rectification/regulation circuit 4 to thereby provide the first output voltage DCV1 to the DC voltage output terminal 5. The first output voltage DCV1 is also applied to a feedback circuit 44 to generate a feedback signal Sfb applied to the PWM control circuit 3.

The PWM control circuit 3 is generally comprised of a PWM controller 31, a gate driving circuit 32, a transistor switching element 33, and a sensing resistor 34. The PWM control circuit 31 receives the feedback signal Sfb generated by the feedback circuit 44 and then generates at an output terminal thereof, based on the feedback signal Sfb, a reference voltage Vref, and a detected signal Ssen detected by the sensing resistor 34, a gate control signal Sg, which is then applied to the gate driving circuit 32 to drive the operation of the transistor switching element 33 to further control the excitation of the primary-side winding 21 of the output transformer 2. The output transformer 2 further comprises a PWM operation voltage winding 23, which generates a PWM operation voltage Vdd to the PWM controller 31.

In the second voltage output circuit loop 200, a second power source (DC power source) 61 is included. In accordance with the present invention, a circuit loop switching control circuit 7 is further provided, functioning for the purposes of detection and control, based on which the second power source 61 is controlled to selectively supply the second output voltage DCV2 to the DC voltage output terminal 5.

The circuit loop switching control circuit 7 in accordance with the first embodiment of the present invention comprises an induction coil 71, a diode 72, a capacitor 73, a resistor 74, and a switching element 75. The circuit loop switching control circuit 7 detects the power supplying condition of the first voltage output circuit loop 100, and based on the detection result, controls the switching element 75 to open/close the circuit thereby controlling the second power source 61 to selectively supply the second output voltage DCV2 to the DC voltage output terminal 5.

The switching element 75 is for example a field-effect switching element, comprising a gate terminal controlled by the gate driving signal Sg1. The diode 72 has a positive terminal connected to an end of the induction coil 71 and a negative terminal connected to the gate terminal of the switching element 75. The capacitor 73 is connected to the negative terminal of the diode 72. The resistor 74 is connected in parallel to the capacitor 73.

When the first power source ACV is in normal operation to regularly supply electrical power, the induction coil 71 is set in coupling with the secondary side of the output transformer 2 to induce an induced voltage, which is applied through the diode 72 and then transmitted through the capacitor 73 for voltage regulation to generate a switching driving signal Sg1 to the gate terminal of the switching element 75, making the switching element 75 open-circuited. Under this condition, the second voltage output circuit loop 200 cannot supply the second output voltage DCV2 to the output terminal 5.

On the other hand, when the first voltage output circuit loop 100 fails to regularly supply the first power source to the output terminal 5, no voltage is induced in the induction coil 71, and this makes the switching element 75 closed-circuited, allowing the second voltage output circuit loop 200 to supply the second output voltage DCV2, through the switching element 75, to the output terminal 5.

Figure 3:
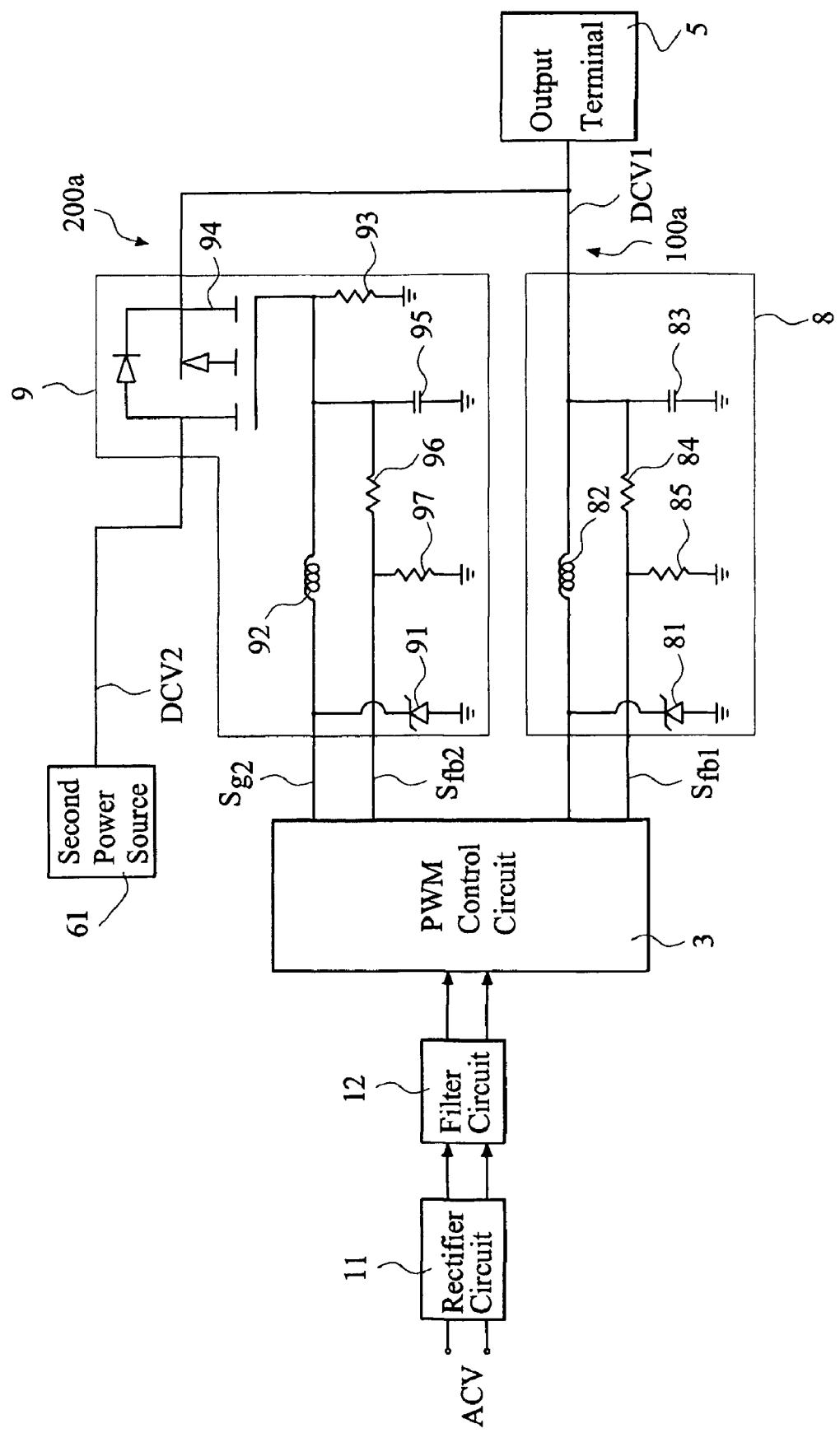
FIG. 3 is a circuit diagram of an automatically switchable dual-power-circuit-loop circuit system constructed in accordance with a second embodiment of the present invention.

FIG. 3 shows an automatically switchable dual-power-circuit-loop circuit system constructed in accordance with a second embodiment of the present invention, which is applicable to a control system of a PWM power converter that comprises no output transformer.

In accordance with the second embodiment of FIG. 3, when a first power source ACV is in normal operation to regularly supply electrical power, a first voltage output circuit loop 100a receives an operation voltage from the first power source ACV and supplies, in turn, a first output voltage DCV1 to a DC voltage output terminal 5. At this time, a second voltage output circuit loop 200a is cut off. On the other hand, when the first voltage output circuit loop 100a fails to supply the first power source to the output terminal 5, the second voltage output circuit loop 200a takes over to supply a second output voltage DCV2 from a DC power source (second power source) to the output terminal 5.

The first voltage output circuit loop 100a is generally comprised of a rectifier circuit 11, a filter circuit 12, a PWM control circuit 3, and a first output voltage supply circuit 8.

The first power source ACV supplies an operation voltage through the rectifier circuit 11 and the filter circuit 12 to the PWM control circuit 3 and further to a voltage regulation element 81 and a serially-connected choke coil 82 to provide the first output voltage DCV1 to the DC voltage output terminal 5. The first output voltage DCV1 is also applied to a feedback circuit, which is comprised of a capacitor 83, a resistor 84, and another resistor 85, to generate a feedback signal Sfb1 to the PWM control circuit 3.

In the second voltage output circuit loop 200a, a second power source (DC power source) 61 is included. In accordance with the present invention, a circuit loop switching control circuit 9 is further provided, functioning for the purposes of detection and control, based on which the second power source 61 is controlled to selectively supply the second output voltage DCV2 to the DC voltage output terminal 5.

The circuit loop switching control circuit 9 in accordance with the second embodiment of the present invention comprises a voltage regulation element 91 and a choke coil 92 connected in series thereto.

When the first power source ACV is in normal operation to regularly supply electrical power, the PWM control circuit 3 generates a switching driving signal Sg2, which is applied through a circuit comprised of the voltage regulation element 91, the serially-connected chock coil 92, and a resistor 93, to control a switching element 94 to selectively set the switching element 94 in open circuit or closed circuit. The switching driving signal Sg2, after transmitted through the choke coil 92, is further applied to a feedback circuit, which is comprised of a capacitor 95, a resistor 96, and another resistor 97, to generate a feedback signal Sfb2 to the PWM control circuit 3.

When the first power source ACV is in normal operation to regularly supply electrical power, since the PWM control circuit 3 generates the switching driving signal Sg2, the switching element 94 is set in an open-circuited condition. Under this condition, the second voltage output circuit loop 200a is not allowed to supply the second output voltage DCV2 to the output terminal 5. On the other hand, when the first voltage output circuit loop 100a fails to supply the first power to the output terminal 5, the PWM control circuit 3 does not generate the switching driving signal Sg2, and this makes the switching element 94 closed-circuited, allowing the second power source 61 to supply the second output voltage DCV2, through the switching element 75, to the output terminal 5. In this respect, the circuit system of the second embodiment of the present invention provides the same effectiveness as that of the first embodiment.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A dual-power supplying system, comprising:
    a first voltage output circuit loop with an output transformer, which receives a first power source and supplies, in turn, a first output voltage through the output transformer to an output terminal;
    a second voltage output circuit loop, which receives a second output voltage from a second power source and selectively supplies the second output voltage to the output terminal; and
    a circuit loop switching control circuit, which comprises an induction coil coupled with the output transformer to detect the first output voltage of the first voltage output circuit loop, and a switching element connected in series to the second voltage output circuit loop, the switching element having an open-circuit condition and a closed-circuit condition, which are switched by a switching driving signal generated by the induction coil of the circuit loop switching control circuit;
    wherein when the first power source is supplied through the first voltage output circuit loop to the output terminal, the induction coil of the circuit loop switching control circuit generates the switching driving signal to switch the switching element of the circuit loop switching control circuit to the open-circuit condition thereby cutting off the second voltage output circuit loop; and wherein when the first voltage output circuit loop fails to supply the first power source to the output terminal, the switching element is set in the closed-circuit condition to allow the second power source to be supplied through the second voltage output circuit loop to the output terminal.

2. The dual-power supplying system as claimed in claim 1, wherein the first power source comprises an alternating-current power source, which is applicable through a rectifier circuit and a filter circuit to provide the first power source to the output transformer and wherein the second power source comprises a direct-current power source.

3. The dual-power supplying system as claimed in claim 1, wherein the switching element comprises a field-effect switching element having a gate terminal and wherein the circuit loop switching control circuit comprises:
    a diode having a positive terminal connected to the induction coil and a negative terminal connected to the gate terminal of the switching element;
    a capacitor connected to the negative terminal of the diode; and
    a resistor connected in parallel with the capacitor.

4. A dual-power supplying system, comprising:
    a first voltage output circuit loop with a pulse-width-modulation control circuit and a first output voltage supply circuit connected between the pulse-width-modulation control circuit and an output terminal, which receives a first power source and supplies, in turn, a first output voltage through the first output voltage supply circuit to the output terminal;

a second voltage output circuit loop, which receives a second output voltage from a second power source and selectively supplies the second output voltage to the output terminal; and a circuit loop switching control circuit, which comprises a serially-connected choke coil connected to the pulse-width-modulation control circuit of the first voltage output circuit loop, a switching element connected in series to the second voltage output circuit loop, the switching element having an open-circuit condition and a closed-circuit condition, which are switched by a switching driving signal generated by the pulse-width-modulation control circuit;

wherein when the first power source is supplied through the first output voltage supply circuit to the output terminal, the pulse-width-modulation control circuit generates the switching driving signal to switch the switching element to the open-circuit condition thereby cutting off the second voltage output circuit loop; and wherein when the first power source fails to supply the first power source to the output terminal, the switching element is set in the closed-circuit condition to allow the second power source to be supplied through the second voltage output circuit loop to the output terminal.

5. The dual-power supplying system as claimed in claim 4, wherein the first power source comprises an alternating-current power source, which is applicable through a rectifier circuit and a filter circuit to provide the first power source to the pulse-width-modulation control circuit and wherein the second power source comprises a direct-current power source.

6. The dual-power supplying system as claimed in claim 4, wherein the switching element comprises a field-effect switching element having a gate terminal connected to the choke coil, the switching driving signal generated by the pulse-width-modulation control circuit being applied through the choke coil to control, via the gate terminal, switching of the field-effect switching element between the close-circuit condition and the open-circuit condition, the circuit loop switching control circuit comprising a feedback circuit connected to the gate terminal of the field-effect switching element to generate a feedback signal to pulse-width-modulation control circuit.

\* \* \* \* \*